Jan. 5, 1937.   E. JANETSCHKE   2,066,938
UNIFORM SPEED SYSTEM
Filed March 3, 1934
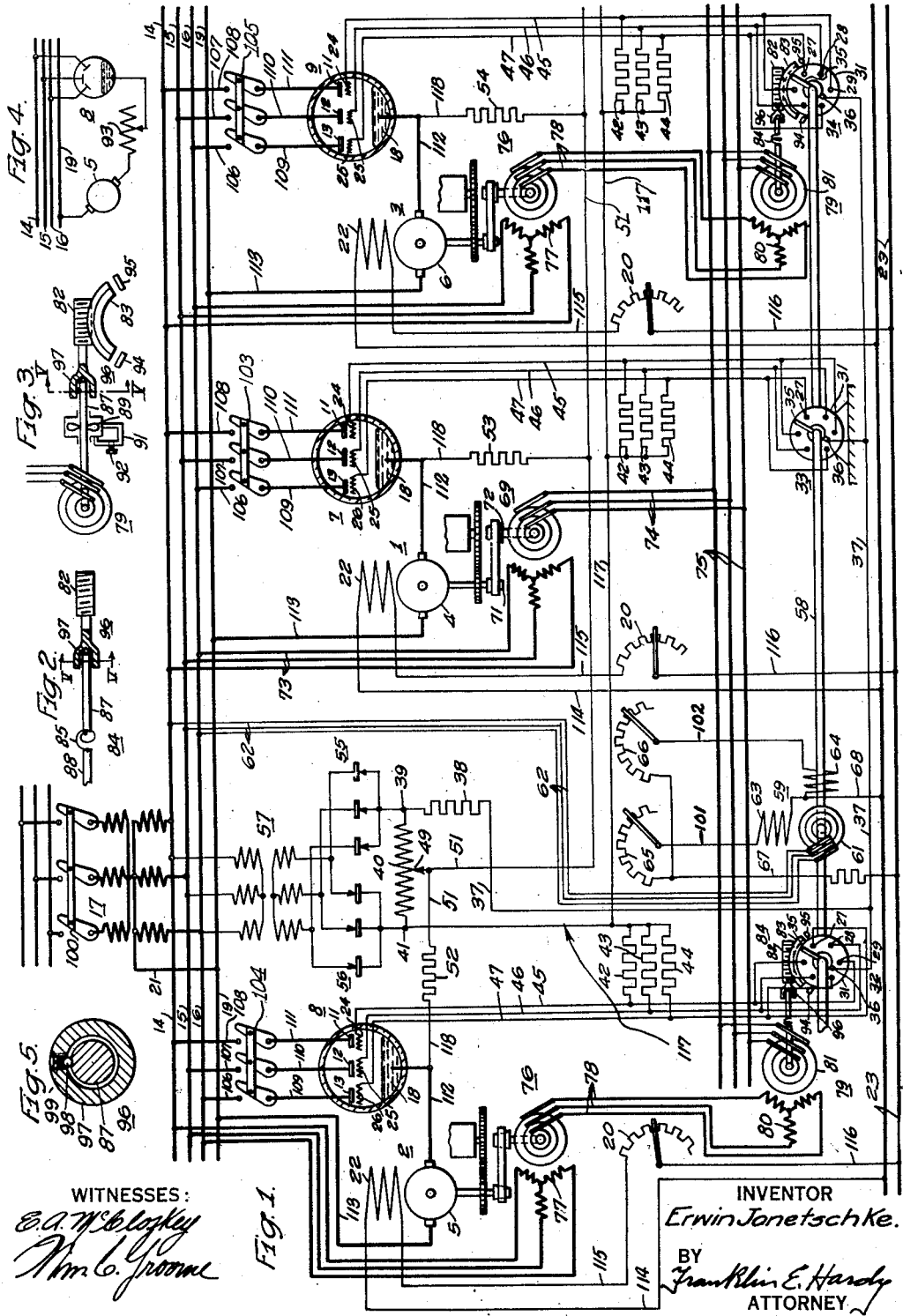
WITNESSES:
E. A. McCloskey
Wm. C. Groome
INVENTOR
Erwin Janetschke.
BY
Franklin E. Hardy
ATTORNEY Patented Jan. 5, 1937

2,066,938

UNITED STATES PATENT OFFICE 2,066,938

UNIFORM SPEED SYSTEM

Erwin Janetschke, Berlin-Charlottenburg, Germany, assignor to Westinghouse Electric & Manufacturing Company, East Pittsburgh, Pa., a corporation of Pennsylvania Application March 3, 1934, Serial No. 713,841
In Germany March 6, 1933

2 Claims. (Cl. 172—293)

My invention relates to speed regulating systems and particularly to such regulating systems for a plurality of motors that are required to operate in a predetermined speed relationship.

In a number of motor applications, such as for driving the several sections of a paper making machine, a continuous wire rolling or drawing mill, etc., it is required that the several parts of the machine driven by separate section driving motors shall operate in a fixed speed ratio.

My invention contemplates the use of controlled rectifiers for the control of the individual motors driving the several sections of a machine. Grid controlled gas or vapor filled discharge devices are preferably used as rectifiers, the same being connected in either the armature circuit or the field circuit of the motor, a separate rectifier being provided for each motor.

The present invention contemplates the use of novel means for controlling the grid circuits of the discharge devices in accordance with the variations in the speeds of the individual motors from their desired or standard value, and, in its broader aspect, is applicable generally to control systems in which grid control vacuum devices are used for speed control.

According to the invention, means are provided for damping the control impulses emanating from a regulating unit associated with a section driving motor, for affecting the grid circuit of the associated discharge device to correspondingly affect the motor controlled by, or supplied with, power through the discharge device. Such regulating units may comprise any means or devices that are actuated by the difference between the standard or desired motor speed and the actual speed of the individual regulated motor, and may comprise mechanical or electrical differentials jointly responsive to a master speed reference means for establishing the desired speed of the regulated motors, and to the actual speed of its associated regulated motor.

One advantage of grid controlled discharge devices, when used in automatic control systems, is the quickness of response to control impulses from a controller effecting correspondingly quick changes in the energizing circuit to the machine being controlled. Such discharge devices have quite different characteristics from devices heretofore used for controlling the speeds of electric motors. The characteristics of the discharge devices can, however, be employed to their full advantage in the operation of control systems for regulating the speeds of plural motor drives, only when there is a possibility of adjusting the speed or rapidity of the transmission of the control impulse to the value which will give the best results under the existing conditions of operation of the machine as a whole.

If a regulating unit for use with plural motor drives, such, for example, as the differential element of a paper machine drive having a standard speed shaft, is connected with a controller that is, in turn, connected in the grid circuit of a discharge device, and if this discharge device controls the circuit of an individual section driving motor of a paper making machine the effect of movements of the controller on the speed of the motor is very different from the action obtained with the use of mechanical regulators when discharge devices are not employed because of hunting action that is not usually present when mechanical regulators are employed. The reason for this appears to be due to the very high speed of transmission of the control impulses by the discharge device which is a characteristic of the device, giving it greater advantage over mechanical devices. If such a control system is provided with damping means, the hunting will disappear and the control system will operate properly and much better and faster than other systems not provided with discharge devices. The application and use of the present invention, therefore, makes it possible to take advantage of the characteristics of discharge devices to a much greater degree than heretofore.

An important advantage of the uniform speed system according to the present invention is that the system can readily be adjusted to the different control systems and drives than has heretofore been the case. It is well known that the requirements by a paper machine drive on a uniform speed system are quite different from those of a continuous roll drive for modern wire drawing rolls that operate at speeds much above those of paper making machines. A paper making machine demands great exactness of control with respect to the adjustment of the speeds of the individual motors and also with respect to the speed differences between the several motors, which must be very accurate because of the weakness of the web. In rolling or wire drawing mills, greater regulating speeds are required because of the greater working speeds of the material. Since, however, the material being drawn or rolled is quite sensitive to irregularities in the drawing process, such as changes in the tension between the individual stands, it is necessary that the motors be controlled very accurately.

Referring to the drawing,

Figure 1 is a diagrammatic view of apparatus and circuits illustrating a preferred embodiment of my invention;

Fig. 2 is an enlarged view of damping means provided between the differential devices and the controllers;

Figs. 3 and 4 show other damping means for delaying the full effect of a regulating impulse upon the regulated motor, and Fig. 5 is an enlarged cross sectional view of the shaft driven by the differential element taken on lines V—V of Fig. 2 or 3 showing a mechanical coupling between the controller driven shafts.

In the drawing a number of motors 1, 2 and 3 are illustrated as connected through mechanical gearing to rolls representing the separate sections of a paper making machine or a rolling mill. The motors 1, 2 and 3 are provided respectively with armature windings 4, 5 and 6 that are supplied with current through electronic discharge devices 7, 8 and 9 that are each provided with three anodes 11, 12, 13 connected respectively to the conductors 14, 15 and 16 of a three phase alternating current circuit supplied with power from a transformer 17. Each of the electronic discharge devices 7, 8 and 9 are provided with a cathode 18 that is connected through the armature winding of its associated motor 1, 2 or 3 and to a conductor 19 that is connected by a conductor 21 to the neutral point of the secondary winding of the transformer 17. Each of the motors 1, 2 and 3 is provided with a field winding 22 shown as connected through a field adjusting rheostat 20 to any suitable direct current supply represented by the conductors 23.

Respectively associated with the anodes 11, 12 and 13 of each of the electronic discharge devices are control grids 24, 25 and 26 that are connected to contact members or brushes 29, 28 and 27, respectively, mounted on a stator 31 of control devices 32, 33 and 34 associated respectively with the discharge devices 8, 7 and 9. Each control device 32, 33 and 34 is provided with a rotor element and a movable contact making brush 35 carried thereby for engaging the contact members 27, 28 and 29, the rotor brush 35 being connected through a slip ring and contact member 36 to a conductor 37, that is connected through a resistor 38 to one terminal 39 of a resistor 40, the other terminal 41 of which is connected through resistors 44, 43 and 42, respectively, to conductors 47, 46 and 45 that connect the contact members 27, 28 and 29, respectively, of the controllers to the grid members 26, 25 and 24 of the discharge device. A point 49 of the resistor 40, intermediate its terminals, is connected by conductor 51 and through resistors 52, 53 and 54, respectively, to the cathodes 18 of the tubes 8, 7 and 9. The terminals 39 and 41 of the resistor 40 are connected, through groups of rectifiers 55 and 56, to the three phases of a transformer 57 that is, in turn, connected to the conductors 14, 15 and 16 of the three phase alternating current supply circuit. The rotors of the several controllers 32, 33 and 34 are connected to a common shaft 58 and driven by an alternating current synchronous motor 59 having a three-phase rotor element 61, connected through conductors 62 to the three-phase supply conductors 14, 15 and 16, and with two field windings 63 and 64 that are displaced 90 electrical degrees on the stator of the motor and are connected, respectively, through field adjusting rheostats 65 and 66, and by conductors 67 and 68, to the direct current supply source 23.

The power flow through the electronic discharge devices 7, 8 and 9 and the motors 1, 2 and 3 is determined by the position of the zero current point in the alternating current wave of the source supplying the discharge device with respect to the time of ignition, that is, to the phase displacement angle between the time of ignition and the time of zero current, or the maximum value of the half wave of anode voltage. A necessary condition for the proper operation of the discharge devices is that the control means which determines the ignition time instant, that is, which controls the periodic voltage variations in the grid circuit must remain in synchronism with the voltage supplied to the anodes. This is accomplished by connecting the rotors of the several controllers 32, 33 and 34 to be driven by the synchronous motor 59 that operates in synchronism with the frequency of the circuit 14, 15 and 16 that is connected to the anodes of the discharge devices. The two field windings 63 and 64 provide two different excitation components that may be adjusted by the field regulating rheostats 65 and 66 to vary the angle of field flux with respect to the rotor 61 of the synchronous motor, thereby varying the phase relation between the synchronous motor and its alternating current supply to correspondingly vary the ignition timing of the discharge devices, and, consequently, the fundamental speed of the several motors 1, 2 and 3.

One of the motors 1 may be selected as the guide motor to which the speeds of the other motors of the system are compared and regulated. It is desirable that the guide motor be selected as the one having the largest rotating mass, or inertia, of the several motors of the group. A standard generator 69 is connected through the cone pulleys 71 and 72 to be driven in accordance with the speed of the motor 1, and serves as a master speed reference means for determining the speed of the regulated motors 2 and 3. The generator 69 is provided with stator windings connected by the circuit conductors 73 to the alternating current supply 14, 15 and 16, and with rotor windings connected by conductors 74 to the standard circuit 75. Each of the controlled motors 2 and 3 is provided with a similar control generator 76 driven through similar cone pulleys in accordance with the speeds of the motors 2 and 3 respectively and having stator windings 77 connected to the alternating current circuit 14, 15 and 16 and rotor windings supplying an output frequency to the conductors 78.

Associated with each of the regulated motors 2 and 3 is an electrical differential 79 having a stator winding 80, energized in accordance with the frequency of the control generator 76, operated by the section driving motor, and a rotor winding 81 connected to the standard circuit 75 and energized in accordance with the frequency of the standard generator 69 or master speed reference means. When the speed of the regulated motor 2 or 3 corresponds to its desired value, the frequency in the output circuit 78 from its associated control generator 76, corresponds to the frequency in the circuit 75. A variation in these two frequencies causes the electrical differential 79 to operate in the one, or in the other direction, depending upon whether the frequency in the circuit 78 is greater than or less than that of the circuit 75, and to correspondingly actuate a worm 82 that engages a gear 83 connected to the stator portion 31 of the control device 32 or 34, and actuating the stator to move the position of the brushes 27, 28 and 29 about the axis of the shaft 58 and correspondingly change the timing of the ignition of the associated discharge device, thus changing the speed of the motor driven therefrom. The stator portion of the controller 33, associated with the guide motor 1, is stationary and this motor is controlled only by changes in timing, as determined by changes in the phase relation of the synchronous motor 59 with respect to alternating current in the anode energizing circuit 14, 15 and 16.

It is desirable to provide damping means for damping the regulating impulses emanating from the differential devices and affecting the grid circuits of the discharge devices to correspondingly affect the rate of regulation of the motors 2 and 3. Such damping may be effected by mechanical means in the form of springs mounted on movable control parts, as illustrated at 84, and shown in greater detail in Fig. 2 as comprising a spring element 85 connected between shaft portions 87 and 88 connected to the spring element 85 for driving the worm 82 in accordance with the operation of the differential 79. The spring 85 is, preferably, made adjustable to suit different types of motor applications. Another form of damping device is illustrated in Fig. 3, which shows a centrifugal rotating pump 89 mounted upon the shaft 87 connecting the differential device 79 to the worm 82, that, when operated, pumps a liquid through the circuit 91, the resistance of which may be adjusted by a valve 92. Electrical damping means may also be used connected in the circuit between the controller and the control grids. The same result may also be obtained by damping means connected in the anode circuit of the discharge devices between the discharge device and the motor operated thereby such as a reactor 93 shown in Fig. 4.

It may be preferable under certain circumstances to insure that the damping means does not become effective immediately at the beginning of the regulating operation. Accordingly, the damping means illustrated are such that the control impulse is undamped at the first part of the regulating action and is effective after a certain time only. Thus, if sudden changes of load occur on the motor energized through a regulated grid control discharge device, the control impulse sent out will at first be large and will thereafter decrease and finally become zero.

A further feature of the invention is the provision of means connected between the regulating device and the grid control device for limiting the control angle or phase displacement between the grid voltage and the anode voltage, that is, the amount of the ignition voltage lag in the grid control discharge device. This is accomplished by providing stops 94 and 95 at opposite ends of the sector 83 connected to the stator 31 of the controller and actuated by the worm 82. The stops 94 and 95 limit movement of the brushes 27, 28 and 29 to a certain angle on either side of a central point. A mechanical connection is provided between the worm gear 82 and the differential 79 shown at 96 in Figs. 1, 2 and 3, and in detail in enlarged section in Fig. 5, as comprising the inner shaft 87 driven by the differential device and an outer shaft 97 connected to the worm 82. The torque between the two shafts is transmitted by a ball 98 which is held in the position shown by a spring 99. As shown as the brush mechanism moves into the one or the other of its limiting positions, and is held thereby the stop 94 or 95, the spring 99 will yield and the two shafts 87 and 97 will move relatively to one another. It is, of course, obvious that the same result can be obtained by other equivalent means.

In operation, the motors 1, 2 and 3 are brought to a fundamental uniform speed as follows. Contact making device 100 is closed and transformer 17 is energized and supplies power to the conductors 14, 15 and 16 of a three-phase alternating current circuit. When the conductors 14, 15 and 16 are energized, current is supplied to the rotor element 61 of synchronous motor 59 through the conductor 62 from the conductors 14, 15 and 16. The field windings 63 and 64 of the synchronous motor 59 are energized from the direct-current supply source 23.

The excitation components of the field windings 63 and 64, which are displaced 90 electrical degrees on the stator of the motor 59, are controlled by adjusting the field rheostats 65 and 66, which are connected by conductor 67 to one of the conductors of the direct-current supply system 23 and by conductors 101 and 102, respectively, to the windings 63 and 64 through conductor 68 to the other conductor of the direct-current supply 23. By adjusting the rheostats 65 and 66, the angle of field flux is varied with respect to the rotor 61 of the synchronous motor and the phase relation between the synchronous motor and its alternating-current source is varied. The synchronous motor 59 drives the shaft 58 to actuate the rotors of the contact control devices 32, 33 and 34. The purpose of the contact control devices will be explained hereinafter.

When the alternating-current supply conductors 14, 15 and 16 are energized, transformer 57 connected thereto is also energized. The transformer 57 is connected through rectifiers 55 and 56 to a resistance 40 to provide a constant source of potential, the purpose of which will be explained hereinafter.

In order to supply current to the armatures 4, 5 and 6 of the motors 1, 2 and 3, the circuit closing members 103, 104, and 105 are actuated to contact making position. The actuation of circuit closing member 103 completes a circuit from the alternating-current source 14, 15 and 16 through conductors 106, 107 and 108 and the circuit closing member 103 which is connected to the anodes 11, 12 and 13 of the thermionic discharge device 7 by conductors 109, 110 and 111 through the discharge device 7 to its cathode 18, which is connected by conductor 112 to the armature 4 of motor 1 and thence through conductor 113 to the neutral conductor 19, which is connected by conductor 21 to a neutral terminal of the secondary winding of transformer 17. Similar circuits for passing current to the armatures 5 and 6 of motors 2 and 3 are completed upon actuation of circuit closing members 104 and 105. The excitation of the field windings 22 of each of the motors 1, 2 and 3 is varied by adjusting the resistor 20. One terminal of the field winding 22 is connected to the direct-current supply system 23 by conductor 114 and the other terminal is connected by conductor 115 through the rheostat 20 and conductor 116 to the other conductor of the direct-current supply 23.

The amount of current conducted through each of the thermionic discharge devices 7, 8 and 9 to the armatures 4, 5 and 6, respectively, depends upon the potential impressed upon the grids 24, 25 and 26 of each of the discharge devices. As shown, the discharge devices employed in this invention are of the conventional gas filled type, wherein there is conduction from the anode to the cathode when the grids have a negative potential impressed upon them. The grids 24, 25 and 26 are connected through conductors 45, 46 and 47 and resistors 42, 43 and 44, respectively, to the positive potential terminal 41 of the constant source of potential by conductor 117, so that a positive potential is impressed on the grids at all times.

If a negative potential is impressed upon the grids, the discharge device becomes conductive at the period in the positive cycle of the alternating-current source at which the negative potential is impressed upon the grid and will act to conduct current to the armatures of the respective motors during the remaining portion of the positive cycle of the alternating-current source. By providing each discharge device with three anodes and three grids, one for each phase of the alternating-current source, the tube functions to conduct a continuous current to the armatures of the motors.

The amount of current conducted through the discharge device to the armatures is regulated by the contact control devices 32, 33 and 34, which are operated by the synchronous motor 59 in synchronism with the alternating-current source. The contact control devices 32, 33 and 34 function to complete a circuit from the cathodes 18 of each of the discharge devices 7, 8 and 9 through conductors 118, resistors 53, 52 and 54, respectively, and conductor 51 to an intermediate terminal 40 of the resistor 48, which is connected at its negative potential terminal 39 through a resistor 38 and conductor 37 to the contact member 36 which is connected through a slip ring and the rotor brush 35 to contact members 27, 28 and 29 positioned on the stator of each of the contact control devices 32, 33 and 34 and connected through conductors 45, 46 and 47 to the grids 24, 25 and 26, respectively. Since the contact control devices 32, 33 and 34 operate in synchronism with the synchronous motor 59, the period in the positive cycle of the alternating-current source at which brush 35 contacts the contact members 27, 28 and 29 is adjusted by varying the phase relation of the synchronous motor 59 with respect to the alternating-current source to either cause the contact of brush 35 and contact members 27, 28 and 29 to lead or lag the alternating-current source and thus to vary the period in the positive cycle of the alternating current source at which the negative potential is impressed upon the grids 24, 25 and 26 of the discharge devices to vary the amount of current conducted to the armatures 4, 5 and 6, and to thus vary the fundamental uniform speed of the motors 1, 2 and 3.

When the motors 1, 2 and 3 are operating at a uniform fundamental speed, the output of generator 69 connected by cone pulleys 71 and 72 to the motor 1, and the output of generators 76 connected to the motors 2 and 3 are equal, and it is evident that the frequency of the stator winding 80 of the differential 79 connected to the generator 76 by conductor 78 and the frequency of the rotor winding 81 of the differential 79 which is connected to generator 69 by conductors 75 and 74 is balanced, and that there will be no tendency of rotor 81 to be actuated to adjust the stator of the contact control device.

Assuming that the load upon the rolls operated by motor 2 is increased, the speed of the motor is decreased with a consequential decrease in the speed of the generator 76 operated thereby. Thus the output of the generator 76 is decreased, and the frequency of the stator winding 80 of the differential 79 connected to the generator 76 by conductor 78 is lowered. Since the frequency of the rotor 81 of the differential 79 connected by means of conductors 75 and 74 to the generator 69 of the constant speed motor 1 has not been changed, there is an unbalanced condition between the stator 80 and the rotor 81 which will tend to actuate the rotor and to function, through the shaft 86, spring 85, shaft 87, shaft 97, worm 82 and the gear 83, to so position the stator 31 of the control device 32 as to advance the brushes 27, 28 and 29 to a position where contact with brush 35 is made at an earlier period in the positive cycle of the alternating-current source to impress an advanced negative potential upon the grids 24, 25 and 26 to allow more current to pass to the armature winding 5 of the motor 2.

As the speed of motor 2 and generator 76 is increased, the frequency of the stator 80 of the differential 79 is increased and approaches that of the rotor 81 controlled by the standard motor 1 until a uniform speed of the motors and a balanced condition in the differential 79 has been reached, and the operation of the control device 32 to shift the brushes 27, 28 and 29 ceases. Under such conditions, the control device 32 effectively controls the ignition timing of the electronic discharge device 8 to maintain motor 2 at the same speed as standard motor 1. Thus the motor 2 is speeded up to the desired constant value of motor 1.

Extreme movement of the stator 31 in response to a regulating movement of the differential 79 is limited by the stop 94 or 95. When the sector 83 abuts the stop 94 or 95, the mechanical connection between the worm gear 82 and the differential functions, through the yielding spring 98, to disperse the torque by allowing the shafts 87 and 97 to move relative to one another. This arrangement prevents the movement of the stator 31 and brushes 27, 28 and 29 to a point where only the maximum or minimum negative potential desired is secured. Otherwise, if the stops 94 and 95 were not provided on the stator, the stator would move so that contact of the brushes would first be made at an earlier period in the positive cycle of the alternating-current source and the movement of the stator would continue until contact of the brushes was made at a later period and the opposite effect from that desired would be secured.

It is to be noted that, if only a momentary decrease in the frequency output of generator 76 is effected, the rotor 81 will not effect a displacement of the stator 31 of the control device 32, for the momentary operation of the rotor 81 will be taken up by the spring 85 rather than be transmitted to the worm 82 and the gear 83, thus effectively damping any momentary or hunting impulses of the motor 2.

If the load upon the rolls operated by the motor 2 should be decreased, the speed of the motor 2 increases with a consequential increase in the speed and output of the generator 76, which, operating through its output circuit 78, effects an increase in the frequency of the stator 80, thus creating an unbalanced condition in the differential 79 and tending to actuate the control device 32 in a direction to shift the brushes 27, 28 and 29, so that contact with the brush 35 is made at a later period in each of the positive cycles of alternating-current from the source 14, 15 and 16 to impress a retarded negative potential upon the grids 24, 25 and 26. The retarded negative potential impressed on the grids 24, 25 and 26 reduces conduction in the discharge device 8 and lowers the power input to the motor 2, thus effectively reducing the speed of motor 2 to the desired speed of the standard motor 1.

Control of motor 3 is effected in a similar manner as that of motor 2.

Modifications in the circuits and apparatus illustrated and described may be made within the spirit of my invention, and I do not wish to be limited otherwise than by the scope of the appended claims.

I claim as my invention:

1. In a regulator system wherein a plurality of motors are required to operate in a predetermined speed relationship, a plurality of motors to be regulated, a master speed reference means for determining the desired speeds for said motors, a polyphase alternating current power source, a grid controlled vapor discharge device associated with each motor for supplying direct current power to the motor from said alternating current supply, a differential device associated with each regulated motor and responsive to variations in the speed thereof from its desired value, a contact controller device associated with each differential device and responsive to an unbalanced condition therein for modifying the control impulses to the grid of said discharge device to correct the motor speed, and damping means connected between the differential device and the contact controller device for effecting movement of the contact device.

2. In a regulator system wherein a plurality of motors are required to operate in a predetermined speed relationship, a master speed reference motor and a motor to be regulated with respect thereto, an alternating current power circuit and grid controlled electronic discharge devices connected thereto for supplying direct current power to said motors, control means actuated in synchronism with the frequency of said alternating current circuit for effecting the ignition of said discharge devices, means for varying the timing of ignition of the discharge device supplying power to said regulated motor in accordance with its variation from its desired speed, and a synchronous motor energized from the same circuit as the anodes of said electronic discharge device for actuating said control means characterized in that the relative position of the rotor and the rotating field of the synchronous motor is adjustable for the purpose of varying the fundamental speed of the system.

ERWIN JANETSCHKE.